(12) United States Patent
Kim et al.

(10) Patent No.: US 12,353,916 B2
(45) Date of Patent: Jul. 8, 2025

(54) SYSTEMS AND METHODS FOR PROCESSING FUNCTIONS IN COMPUTATIONAL STORAGE

(71) Applicant: Samsung Electronics Co., Ltd., Suwon-si (KR)

(72) Inventors: Jonghyeon Kim, San Jose, CA (US); Soogil Jeong, Pleasanton, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/328,693

(22) Filed: Jun. 2, 2023

(65) Prior Publication Data

US 2024/0345882 A1    Oct. 17, 2024

Related U.S. Application Data (60) Provisional application No. 63/458,608, filed on Apr. 11, 2023, provisional application No. 63/458,618, filed on Apr. 11, 2023.

(51) Int. Cl.
     *G06F 9/50*      (2006.01)
     *G06F 9/54*      (2006.01)

(52) U.S. Cl.
     CPC .............. *G06F 9/5027* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 6,112,288 A * | 8/2000 | Ullner | G06F 9/3851 712/15 |
| 7,676,661 B1 * | 3/2010 | Mohan | G06F 9/30003 712/15 |
| 7,913,022 B1 * | 3/2011 | Baxter | G06F 13/1605 711/149 |
| 9,063,974 B2 | 6/2015 | Aingaran et al. | |
| 9,606,836 B2 | 3/2017 | Burger et al. | |

(Continued)

FOREIGN PATENT DOCUMENTS

| | | |
|---|---|---|
| CN | 111124999 B | 3/2023 |
| WO | 2021223356 A1 | 11/2021 |

OTHER PUBLICATIONS

Chou, T. et al., CASCADE: Connecting RRAMs to Extend Analog Dataflow in an End-to-End In-Memory Processing Pradigm, 2019, ACM, pp. 114-125 (Year: 2019).*

(Continued)

*Primary Examiner* — Eric Coleman
(74) *Attorney, Agent, or Firm* — Lewis Roca Rothgerber Christie LLP (57) ABSTRACT

Provided is a method for performing computations near memory, the method including receiving, at a processor core of a storage device, a request to perform a first function on first data, the first function including a first operation and a second operation, performing, by a first processor-core acceleration engine of the storage device, the first operation on the first data, based on first processor-core custom instructions, to generate first result data, and performing, by a first co-processor acceleration engine of the storage device, the second operation on the first result data, based on first co-processor custom instructions.

20 Claims, 6 Drawing Sheets

(56) References Cited

U.S. PATENT DOCUMENTS

| | | | |
|---|---|---|---|
| 9,652,152 | B2 | 5/2017 | Oportus Valenzuela et al. |
| 10,268,412 | B2 | 4/2019 | Guilford et al. |
| 10,860,577 | B2 | 12/2020 | Hosogi et al. |
| 10,963,460 | B2 | 3/2021 | Verma et al. |
| 11,550,642 | B1* | 1/2023 | Estep ............... G06F 9/546 |
| 11,941,397 | B1* | 3/2024 | Tan ............... G06F 9/30101 |
| 2005/0273614 | A1 | 12/2005 | Ahuja et al. |
| 2005/0278502 | A1 | 12/2005 | Hundley |
| 2009/0089542 | A1 | 4/2009 | Laine et al. |
| 2010/0174770 | A1 | 7/2010 | Pandya |
| 2010/0205619 | A1 | 8/2010 | Barsness et al. |
| 2011/0107066 | A1* | 5/2011 | Krishnamurthy ....... G06F 8/457 |
| | | | 712/E9.016 |
| 2011/0119467 | A1 | 5/2011 | Cadambi et al. |
| 2015/0052332 | A1 | 2/2015 | Mortensen |
| 2017/0060588 | A1 | 3/2017 | Choi |
| 2020/0159568 | A1 | 5/2020 | Goyal et al. |
| 2020/0301898 | A1 | 9/2020 | Samynathan et al. |
| 2020/0334176 | A1 | 10/2020 | Li et al. |
| 2021/0224185 | A1 | 7/2021 | Zhou et al. |
| 2021/0271680 | A1 | 9/2021 | Lee et al. |
| 2022/0206846 | A1 | 6/2022 | Windh et al. |
| 2022/0342639 | A1 | 10/2022 | Song |
| 2022/0413849 | A1 | 12/2022 | Jayasena |
| 2023/0062467 | A1* | 3/2023 | Gudapati ............. B60L 3/0076 |
| 2024/0126555 | A1 | 4/2024 | Gayen et al. |
| 2024/0126613 | A1 | 4/2024 | Gayen et al. |

OTHER PUBLICATIONS

Singh, G. et al., A Review of Near-Memory Computing Architectures: Opportunities and Challenges, 2018, IEEE, pp. 608-617. (Year: 2018).*

Khoram, S. et al., Challenges and Opportunities: From Near-memory Computing to In-memory Computing, 2017, ACM, pp. 43-46. (Year: 2017).*

Devic, A. et al., To PIM or Not for Emerging General Purpose Processing in DDR Memory Systems, 2022, ACM, 14 pages. (Year: 2022).*

Salamat, Sahand, et al., NASCENT2: Generic Near-Storage Sort Accelerator for Data Analytics on SmartSSD, ACM Transactions on Reconfigurable Technology and Systems, vol. 15, No. 2, Article 16, Jan. 2022, 29 pages.

Xi, Sam (Likun), et al., Beyond the Wall: Near-Data Processing for Databases, Harvard University, 10 pages.

Item, Maurus et al., "TransPimLib: A Library for Efficient Transcendental Functions on Processing-in-Memory Systems," arxiv.org, Apr. 2023, 12 pages.

Liu, Jiawen et al., "Processing-in-Memory for Energy-efficient Neural Network Training: A Heterogeneous Approach," 2018 51st Annual IEEE/ACM International Symposium on Microarchitecture (MICRO), IEEE, Oct. 2018, pp. 655-668.

EPO Extended European Search Report dated Sep. 6, 2024, issued in corresponding European Patent Application No. 24161374.4 (11 pages).

EPO Extended European Search Report dated Sep. 9, 2024, issued in corresponding European Patent Application No. 24160239.0 (12 pages).

US Office Action dated Sep. 29, 2024, issued in U.S. Appl. No. 18/328,688 (30 pages).

US Final Office Action dated Jan. 22, 2025, issued in U.S. Appl. No. 18/328,688 (21 pages).

US Office Action dated May 21, 2025, issued in U.S. Appl. No. 18/328,688 (19 pages).

* cited by examiner

FIG. 5

SYSTEMS AND METHODS FOR PROCESSING FUNCTIONS IN COMPUTATIONAL STORAGE

CROSS-REFERENCE TO RELATED APPLICATION(S)

This application claims priority to, and benefit of, U.S. Provisional Application Ser. No. 63/458,608, filed on Apr. 11, 2023, entitled "PROCESSOR BASED DATABASE PAGE PROCESSING IN COMPUTATIONAL STORAGE," the entire content of which is incorporated herein by reference.

This application also claims priority to, and benefit of, U.S. Provisional Application Ser. No. 63/458,618, filed on Apr. 11, 2023, entitled "SCAN ENGINE POOL FOR DATABASE SEARCH OPERATION IN COMPUTATIONAL STORAGE," the entire content of which is also incorporated herein by reference.

FIELD

Aspects of some embodiments of the present disclosure relate to systems and methods for processing formatted data and functions in computational storage.

BACKGROUND

In the field of computer storage, a system may include a host and one or more storage devices connected to (e.g., communicably coupled to) the host. Such computer storage systems have become increasingly popular, in part, for allowing many different users to share the computing resources of the system. Storage requirements have increased over time as the number of users of such systems and the number and complexity of applications running on such systems have increased.

Accordingly, there may be a need for methods, systems, and devices that are suitable for improving the use of storage devices in storage systems.

The present background section is intended to provide context only, and the disclosure of any embodiment or concept in this section does not constitute an admission that said embodiment or concept is prior art.

SUMMARY

Aspects of some embodiments of the present disclosure relate to computer storage systems, and provide improvements to computational storage.

According to some embodiments of the present disclosure, there is provided a method for performing computations near memory, the method including receiving, at a processor core of a storage device, a request to perform a first function on first data, the first function including a first operation and a second operation, performing, by a first processor-core acceleration engine of the storage device, the first operation on the first data, based on first processor-core custom instructions, to generate first result data, and performing, by a first co-processor acceleration engine of the storage device, the second operation on the first result data, based on first co-processor custom instructions.

The storage device may be configured to receive the request to perform the first function via a communication protocol, the first processor-core custom instructions may cause the first processor-core acceleration engine to perform the first operation, and the first co-processor custom instructions may cause the first co-processor acceleration engine to perform the second operation.

The request may be received by an application programming interface (API) coupled to the processor core.

The method may further include receiving a request to perform a second function on second data, wherein the second function includes a third operation and a fourth operation, and the processor core stores second processor-core custom instructions and second co-processor custom instructions, performing, by a second processor-core acceleration engine, the third operation, based on the second processor-core custom instructions, to generate second result data, and performing, by a second co-processor acceleration engine of the storage device, the fourth operation on the second result data, based on the second co-processor custom instructions.

The method may further include receiving a request to perform a second function on second data, wherein the second function includes the first operation and a third operation, and the processor core stores second co-processor custom instructions, performing, by the first processor-core acceleration engine, the first operation, based on the first processor-core custom instructions, to generate second result data, and performing, by a second co-processor acceleration engine of the storage device, the third operation on the second result data, based on the second co-processor custom instructions.

The first processor-core acceleration engine may be configured to perform an acceleration operation associated with the first function, the acceleration operation may include at least one of a compare operation, a decoding operation, a parsing operation, a graph-traversing operation, a linked-list operation, and a parallel-comparison operation.

The first co-processor acceleration engine may be configured to perform a function-specific algorithm associated with the first function, the function-specific algorithm may include at least one of a compression algorithm, a decompression algorithm, an artificial-intelligence (AI) neural-network training algorithm, and an AI inferencing-engine algorithm.

According to one or more other embodiments of the present disclosure, there is provided a system for performing computations near memory, the system including a processing unit including a processor core storing first processor-core custom instructions and first co-processor custom instructions, and including a first processor-core acceleration engine, and a co-processor including a first co-processor acceleration engine, and being coupled to the processor core, wherein the processing unit is configured to receive a request to perform a first function on first data, the first function including a first operation and a second operation, cause the first processor-core acceleration engine to perform the first operation on the first data, based on the first processor-core custom instructions, to generate first result data, and cause the first co-processor acceleration engine to perform the second operation on the first result data, based on the first co-processor custom instructions.

The processing unit may be configured to receive the request to perform the first function via a communication protocol, the first processor-core custom instructions may cause the first processor-core acceleration engine to perform the first operation, and the first co-processor custom instructions may cause the first co-processor acceleration engine to perform the second operation.

The request may be received by an application programming interface (API) coupled to the processor core.

The processing unit may be configured to receive a request to perform a second function on second data, wherein the second function includes a third operation and a fourth operation, and the processor core stores second processor-core custom instructions and second co-processor custom instructions, cause a second processor-core acceleration engine to perform the third operation, based on the second processor-core custom instructions, to generate second result data, and cause a second co-processor acceleration engine to perform the fourth operation on the second result data, based on the second co-processor custom instructions.

The processing unit may be configured to receive a request to perform a second function on second data, wherein the second function includes the first operation and a third operation, and the processor core stores second co-processor custom instructions, cause the first processor-core acceleration engine to perform the first operation, based on the first processor-core custom instructions, to generate second result data, and cause a second co-processor acceleration engine to perform the third operation on the second result data, based on the second co-processor custom instructions.

The first processor-core acceleration engine may be configured to perform an acceleration operation associated with the first function, the acceleration operation may include at least one of a compare operation, a decoding operation, a parsing operation, a graph-traversing operation, a linked-list operation, and a parallel-comparison operation.

The first co-processor acceleration engine may be configured to perform a function-specific algorithm associated with the first function, the function-specific algorithm may include at least one of a compression algorithm, a decompression algorithm, an artificial-intelligence (AI) neural-network training algorithm, and an AI inferencing-engine algorithm.

According to one or more other embodiments of the present disclosure, there is provided a storage device for performing computations near memory, the storage device including a processing unit including a processor core storing first processor-core custom instructions and first co-processor custom instructions, and including a first processor-core acceleration engine, and a co-processor including a first co-processor acceleration engine, and being coupled to the processor core, wherein the storage device is configured to receive a request to perform a first function on first data, the first function including a first operation and a second operation, cause the first processor-core acceleration engine to perform the first operation on the first data, based on the first processor-core custom instructions, to generate first result data, and cause the first co-processor acceleration engine to perform the second operation on the first result data, based on the first co-processor custom instructions.

The storage device may be configured to receive the request to perform the first function via a communication protocol, the first processor-core custom instructions may cause the first processor-core acceleration engine to perform the first operation, and the first co-processor custom instructions may cause the first co-processor acceleration engine to perform the second operation.

The request may be received by an application programming interface (API) coupled to the processor core.

The storage device may be configured to receive a request to perform a second function on second data, wherein the second function includes a third operation and a fourth operation, and the processor core includes second processor-core custom instructions and second co-processor custom instructions, cause a second processor-core acceleration engine to perform the third operation, based on the second processor-core custom instructions, to generate second result data, and cause a second co-processor acceleration engine to perform the fourth operation on the second result data, based on the second co-processor custom instructions.

The storage device may be configured to receive a request to perform a second function on second data, wherein the second function includes the first operation and a third operation, and the processor core stores second co-processor custom instructions, cause the first processor-core acceleration engine to perform the first operation, based on the first processor-core custom instructions, to generate second result data, and cause a second co-processor acceleration engine to perform the third operation on the second result data, based on the second co-processor custom instructions.

The first processor-core acceleration engine may be configured to perform an acceleration operation associated with the first function, the acceleration operation may include at least one of a compare operation, a decoding operation, a parsing operation, a graph-traversing operation, a linked-list operation, and a parallel-comparison operation, and the first co-processor acceleration engine may be configured to perform a function-specific algorithm associated with the first function, the function-specific algorithm may include at least one of a compression algorithm, a decompression algorithm, an artificial-intelligence (AI) neural-network training algorithm, and an AI inferencing-engine algorithm.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

DETAILED DESCRIPTION

Aspects of the present disclosure and methods of accomplishing the same may be understood more readily by reference to the detailed description of some embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a system may include a host and one or more storage devices communicably coupled to the host. The storage devices may be configured to perform functions for applications running on the host. For example, the storage devices may be computational storage devices. As used herein, a "computational storage device" is a storage device that includes a processing circuit, in addition to a storage device controller, for performing functions near memory. The processing circuit may include (e.g., may be) a hardware logic circuit (e.g., an application specific integrated circuit (ASIC) or a field programmable gate array (FPGA)). The processing circuit may be configured to perform a function for the applications running on the host. For example, the system may be configured to enable the applications to select a storage-device method for performing a function, instead of a host-processor method for performing the function. For example, the storage-device method may be more efficient at performing the function than the host-processor method (or a general-purpose embedded processor method) due to the hardware logic circuits of the storage device, which can process data faster than the software logic of the host processor. For example, host-processors and general-purpose embedded processors may not be optimal for throughput and power consumption.

However, in some cases, hardware logic circuits may not be sufficiently flexible to process different formats and different functions. For example, storage devices have limited sizes, which can accommodate a limited number of different hardware logic circuits. Furthermore, hardware may not be as easily modified as software. Thus, a given storage device may not be capable of performing a sufficient variety of functions or may not be capable of performing functions on a sufficient variety of data formats.

Aspects of some embodiments of the present disclosure provide for a storage device utilizing a combination of software instructions and hardware acceleration engines near memory to accelerate the performance of functions at the storage device while offering more flexibility than methods utilizing only hardware logic circuits to perform functions at the storage device. Aspects of some embodiments of the present disclosure offer improvements and advantages over performing functions with a general-purpose host processor or with only general-purpose embedded processors, such as faster processing that consumes less power and lower latency. Aspects of some embodiments of the present disclosure also offer improvements and advantages over performing functions with only function-specific hardware in a computational storage device, such flexibility to perform a greater variety of functions on a greater variety of data formats.

Figure 1A:
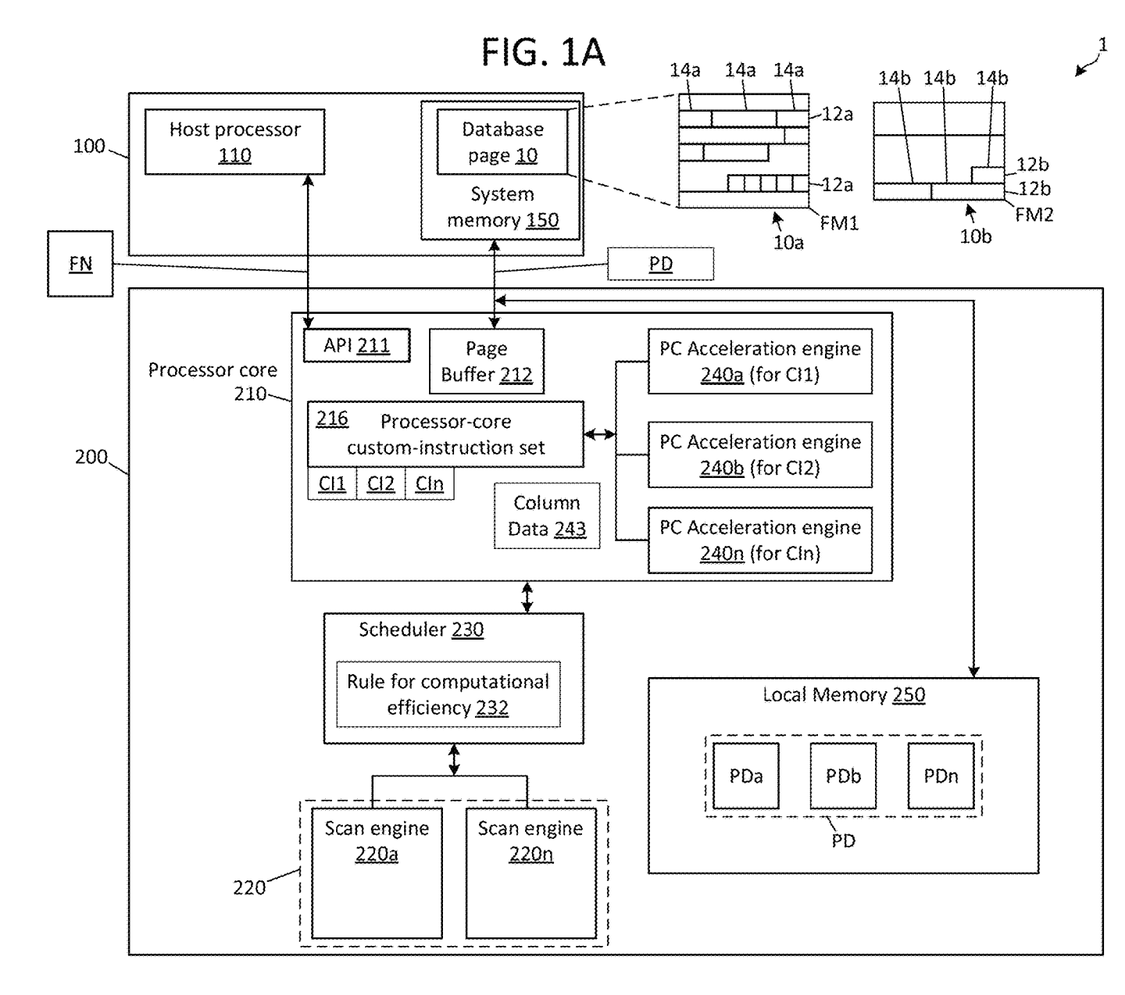
FIG. 1A is a system diagram depicting an architecture for processing formatted data in computational storage, according to some embodiments of the present disclosure.

FIG. 1A is a system diagram depicting an architecture for processing formatted data in computational storage, according to some embodiments of the present disclosure.

Referring to FIG. 1A, a system 1 for processing formatted data may include a host 100 and a storage device 200 (e.g., a computational storage device). The host 100 may include a host processor 110 (e.g., a central processing unit (CPU) and/or a graphics processing unit (GPU)). The host 100 and the storage device 200 may be associated with a system memory 150. For example, the system memory 150 may include data stored in the system 1 on behalf of users (e.g., end users and/or service providers) of the system 1. In some embodiments, host 100 may be external to the storage device 200 (e.g., the storage device 200 may be remote from the host 100). For example, the storage device 200 may be a networked device communicably coupled to the host 100 via a communications link that is compatible with one or more of the following protocols: Representational State Transfer (REST)/inter-process communication (IPC)/Remote Procedure Call (RPC) over non-volatile memory express (NVMe)/NVMe over Fabrics (NVMe-oF)/Compute Express Link (CXL)/Peripheral Component Interconnect Express (PCIe)/Remote Direct Memory Access (RDMA)/Transmission Control Protocol (TCP)/Internet Protocol (IP), etc.

In some embodiments, the system memory 150 may include formatted data. For example, the system 1 may provide database page processing for a variety of different data page formats. Database page processing is a function used for database scan acceleration in computational storage. A "database page," as used herein, is a data structure including fields associated with types of data in a data set.

Conventional database-search acceleration hardware in computational storage only supports particular database formats because the page processing is implemented in hardware (e.g., ASIC, FPGA, and/or the like). Accordingly, such conventional databases may not be sufficiently flexible to handle requests from a variety of users. Also, such conventional databases may not be sufficiently adaptable. For example, if a page format is changed in the future by a database version update, hardware-based page processing may not support the new page format. Changing the hardware to work with the new page format may be a costly process. As discussed above, in some embodiments of the present disclosure, database page processing may be implemented in the system 1 to provide flexibility and adaptability for performing database scan acceleration functions.

The formatted data may include a database page 10. For example, the system 1 may perform database page processing with respect to a first database page 10a. The first database page 10a may be associated with a first data set and may have a first format FM1. The first data set may be data stored on behalf of a particular user. The system 1 may also be capable of performing database page processing with respect to a second database page 10b, in addition to the first database page 10a. The second database page 10b may be associated with a second data set and may have a second format FM2. The second data set may be data stored on behalf of another particular user. The first format FM1 and the second format FM2 may be different formats. For example, the first database page 10a may have first database page columns 14a and first database page rows 12a (e.g., first tuples). The second database page 10b may have second database page columns 14b and second database page rows 12b (e.g., second tuples). As can be seen in FIG. 1A, the rows and columns of the first database page 10a and the second database page 10b may have different formats. The system 1 may perform an operation (e.g., a decode operation) on page data PD corresponding to the first database page 10a and/or the second database page 10b to identify relevant data (e.g., relevant data requested by a user).

In some embodiments, the storage device 200 may include a processor core 210. The processor core 210 may be coupled to an application programming interface (API) 211. The processor core 210 may be coupled to a page buffer 212. Although the API 211 and the page buffer 212 are depicted as being within the processor core 210, it should be understood that the API 211 and/or the page buffer 212 may be external to the processor core 210. The processor core 210 may receive a request (e.g., a command or instructions) to perform a function FN from the host 100. The processor core 210 may receive the instructions to perform the function FN by way of the API 211. The processor core 210 may receive the page PD by way of a page buffer 212.

The processor core 210 may include (e.g., may store) a processor-core custom-instruction set 216. The processor-core custom-instruction set 216 may include one or more processor-core custom instructions. For example, the processor-core custom-instruction set 216 may include one or more processor-core custom instructions CI (individually depicted as CI1-CIn (where n is a positive integer). In some embodiments, the processor-core custom instructions CI may be run on a general-purpose-processor portion of the processor core 210. For example, the processor core 210 may have an architecture including a general-purpose embedded processor, such as an Advanced Reduced Instruction Set Computing (RISC) Machine (ARM) architecture, a RISC-V architecture, or a Tensilica architecture. The processor core 210 may include one or more processor-core acceleration engines 240 (individually depicted as 240a-240n). The processor-core acceleration engines 240 may be hardware circuits (e.g., portions of a hardware circuit) used to implement the processor-core custom instructions CI. For example, first processor-core custom instructions CI1 may cause a first processor-core acceleration engine 240a to perform one or more operations associated with the function FN. Second processor-core custom instructions CI2 may cause a second processor-core acceleration engine 240b to perform one or more operations associated with the function FN. In some embodiments, the processor-core acceleration engines 240 may be utilized by the storage device 200 to perform generalized (e.g., general) acceleration operations. For example, the generalized acceleration operations performed by the processor-core acceleration engines 240 may be operations that are common to a variety of functions (e.g., compare operations, addition operations, subtract operations, multiplication operations, decoding operations, parsing operations, graph-traversing operations, linked-list operations, parallel-comparison operations, and/or the like). The generalized acceleration operations may each have a decode stage, an execute stage, and a writeback stage. For example, at a decode stage of a compare operation, the processor-core custom instructions CI and/or one or more processor-core acceleration engines 240 may decode an instruction to determine that the operation is a compare operation. At the execute stage, one or more processor-core acceleration engines 240 may perform the compare operation. At the writeback stage, one or more processor-core acceleration engines 240 may generate result data for further processing by another component of the storage device 200. For example, in the case of database page processing, a processor-core acceleration engine may return column data 243 as result data for further processing.

As used herein, "custom instructions," refer to software instructions stored on the storage device 200, which are specific to the storage device 200 and cause the hardware logic circuits (e.g., the acceleration engines) of the storage device 200 to perform operations associated with requested functions.

Figure 1B:
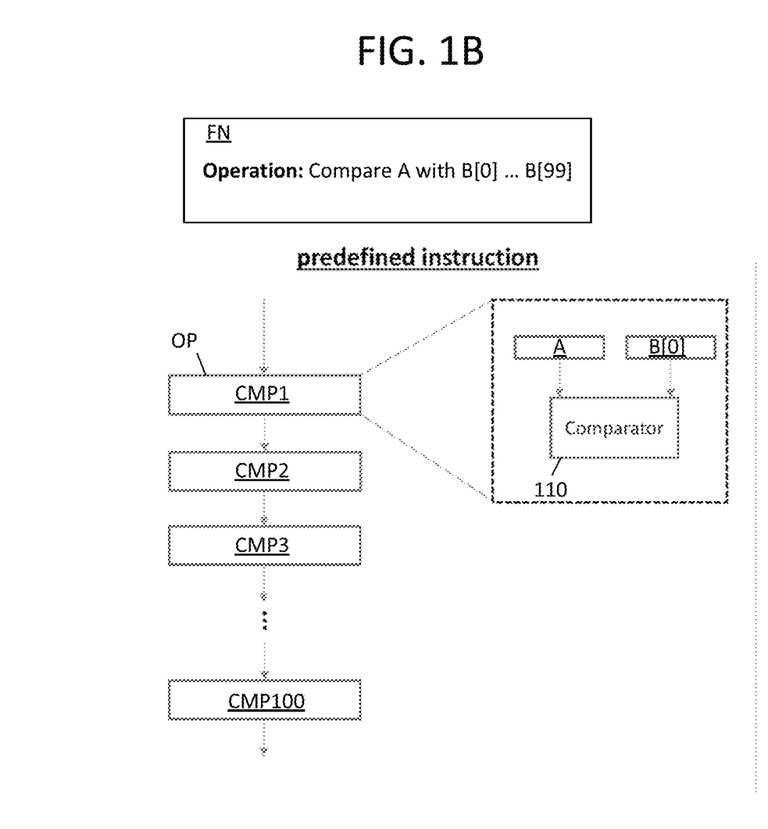
FIG. 1B is a diagram depicting predefined instructions associated with an example function.
Figure 1C:
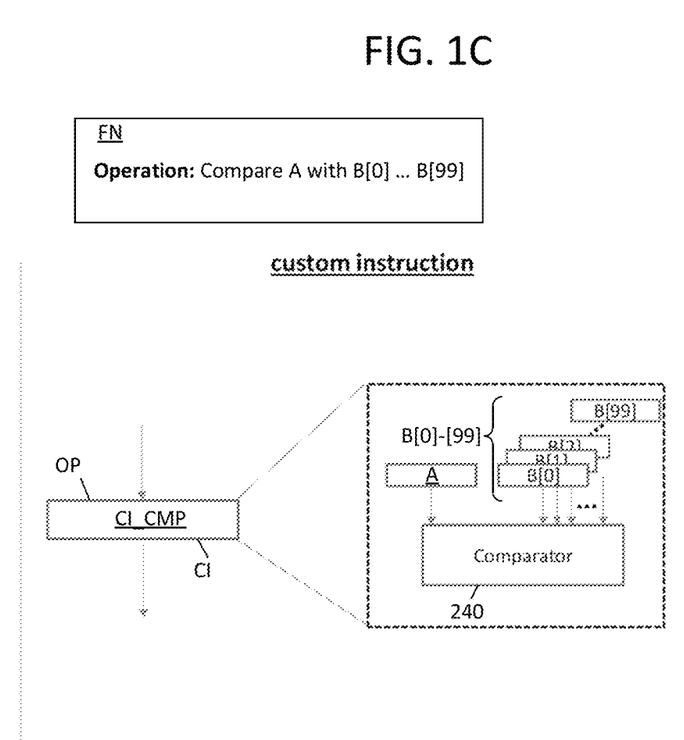
FIG. 1C is a diagram depicting custom instructions associated with the example function, according to some embodiments of the present disclosure.

FIG. 1B is a diagram depicting predefined instructions associated with an example function. FIG. 1C is a diagram depicting custom instructions associated with the example function, according to some embodiments of the present disclosure.

Referring to FIG. 1B, the host processor 110 could be utilized to perform the function FN based on predefined instructions. For example, the function FN could include a comparison operation to compare item A (e.g., the last name "Kim") with one hundred results from column B (e.g., a column listing the last names of all employees of a company). Using predefined (e.g., basic) instructions common to general-purpose processors, the host processor 110 could perform one hundred predefined compare operations OP (e.g., CMP1-CMP100) one at a time.

Referring to FIG. 1C, a processor-core acceleration engine 240 of the storage device 200 could be utilized to perform the function FN based on custom instructions CI. For example, the processor-core acceleration engine 240 could be implemented to process all one hundred operations substantially at once, based on a single custom instruction CI operation OP (e.g., a comparison custom instruction CI_CMP). Accordingly, the custom instructions CI may be utilized to direct the processing of functions within the storage device 200 such that functions may be performed more efficiently than with a general-purpose processor, such as a CPU or GPU. Furthermore, multiple custom instructions CI may be stored on the storage device 200 (e.g., at a general-purpose processing portion of the processing core 210) to allow flexibility in causing different acceleration engines within the storage device 200 to handle different operations corresponding to different functions and different data formats.

Referring back to FIG. 1A, the storage device 200 may include a pool of scan engines 220. The pool of scan engines 220 may include one or more scan engines. For example, the pool of scan engines 220 may include a first scan engine 220a and a second scan engine (e.g., an n-th scan engine 220n). The scan engines may perform further processing operations on the result data generated by the processor-core acceleration engines 240. For example, the first scan engine 220a may perform a scan operation on a portion of the page data PD corresponding to a first column, and an n-th scan engine 220n may perform a scan operation on a portion of the page data PD corresponding an n-th column. The scan engines may be external to the processor core 210 and may be referred to as extra-processor-core circuits. In some embodiments, the extra-processor-core circuits may be hardware logic circuits that are utilized to perform more complex and/or heavy algorithms (e.g., function-specific accelerations) than the processor-core acceleration engines 240. It should be understood that, in some embodiments, some hardware logic circuits that are utilized to perform function-specific accelerations may be included within the processor core 210. For example, it should be understood that, in some embodiments, the circuits described as extra-processor-core circuits herein may not be limited to being located outside of the processor core 210.

Conventionally, each scan engine is assigned to only one column or to no columns of a database page. In some cases, less than all scan engines are utilized for some scan operations. For example, some scan engines may be in an idle state during a scan operation if there are fewer columns than scan engines. In some cases, scan engines may not be capable of handling a column having an index greater than the number of scan engines.

To resolve such problems, in some embodiments of the present disclosure, the storage device 200 may include a scheduler 230 to assign any scan engine 220a-n to any column.

Figure 2:
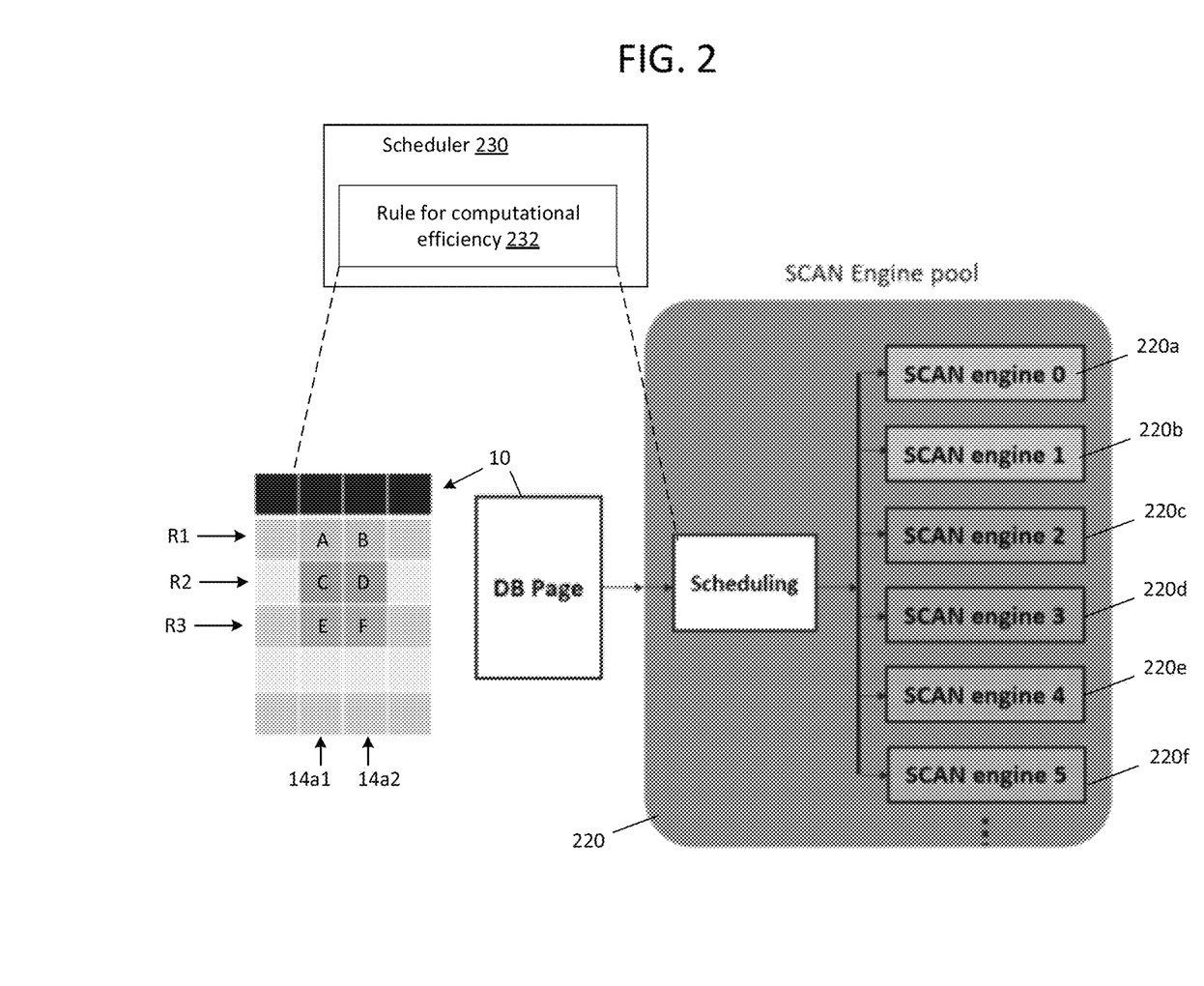
FIG. 2 is a diagram depicting a scheduling of scan engines, according to some embodiments of the present disclosure.

FIG. 2 is a diagram depicting a scheduling of scan engines, according to some embodiments of the present disclosure.

Referring to FIG. 2, the scheduler 230 may be utilized with the pool of scan engines 220, including scan engines 220a-f, to improve the efficiency of database page processing. In some embodiments, the scheduler 230 may assign any scan engine 220 to any column associated with a database page 10, based on a rule for computational efficiency 232. For example, instead of using only one scan engine per column, the scheduler 230 may assign the first scan engine 220a to perform a scan operation on data corresponding to a portion A of a first column 14a1 and may assign another scan engine (e.g. a third scan engine 220c) to perform a scan operation on data corresponding to a portion C of the first column 14a1. Similarly, the scheduler 230 may assign a second scan engine 220b to perform a scan operation on data corresponding to a portion B of a second column 14a2 and may assign another scan engine (e.g., a fourth scan engine 220d) to perform a scan operation on data corresponding to a portion D of the second column 14a2.

Referring back to FIG. 1A, in some embodiments, the storage device 200 may include a local memory 250. The local memory 250 may be used to store page data PD (e.g., PDa-n) corresponding to different formats for processing later. The local memory 250 may include a non-volatile memory.

Accordingly, database page processing, according to some embodiments of the present disclosure, may include one or more of the following operations. The host 100 may send a request (e.g., a command or instructions) to the storage device 200 to perform the function FN on page data PD associated with the first database page 10a having the first format FM1. The function FN may be a scan function. The scan function may include multiple operations (e.g., the scan function may be performed by way of multiple smaller operations). For example, the scan function may include a decode operation and a compare operation.

The storage device 200 may receive the request to perform the function FN at the processor core 210 by way of the API 211. The storage device 200 may receive the page data PD associated with the first database page 10a at the page buffer 212. The storage device 200 may use the processor-core custom-instruction set 216 to direct the performance of the decode operation and the compare operation to different processing circuits within the storage device 200. For example, the first processor-core custom instructions CI1 may cause the first processor-core acceleration engine 240a to perform the decode operation for determining the first format FM1 from the page data PD corresponding to the first database page 10a. The first processor-core acceleration engine 240a may generate result data based on the first processor-core custom instructions CI1. For example, the first processor-core acceleration engine 240a (or another processor-core acceleration engine 240) may extract column data 243 from the page data PD based on the decode operation. In some embodiments, the first processor-core acceleration engine 240a (or one or more other processor-core acceleration engines 240) may perform a page rule-checking operation (e.g., to validate the page data).

The first processor-core custom instructions CI1 may also cause an extra-processor-core circuit (e.g., the first scan engine 220a) to perform the compare operation based on (e.g., on) the column data 243. Additionally, the scheduler 230 may cause the first scan engine 220a to perform the compare operation in conjunction with an n-th scan engine 220n for improved efficiency.

Figure 3:
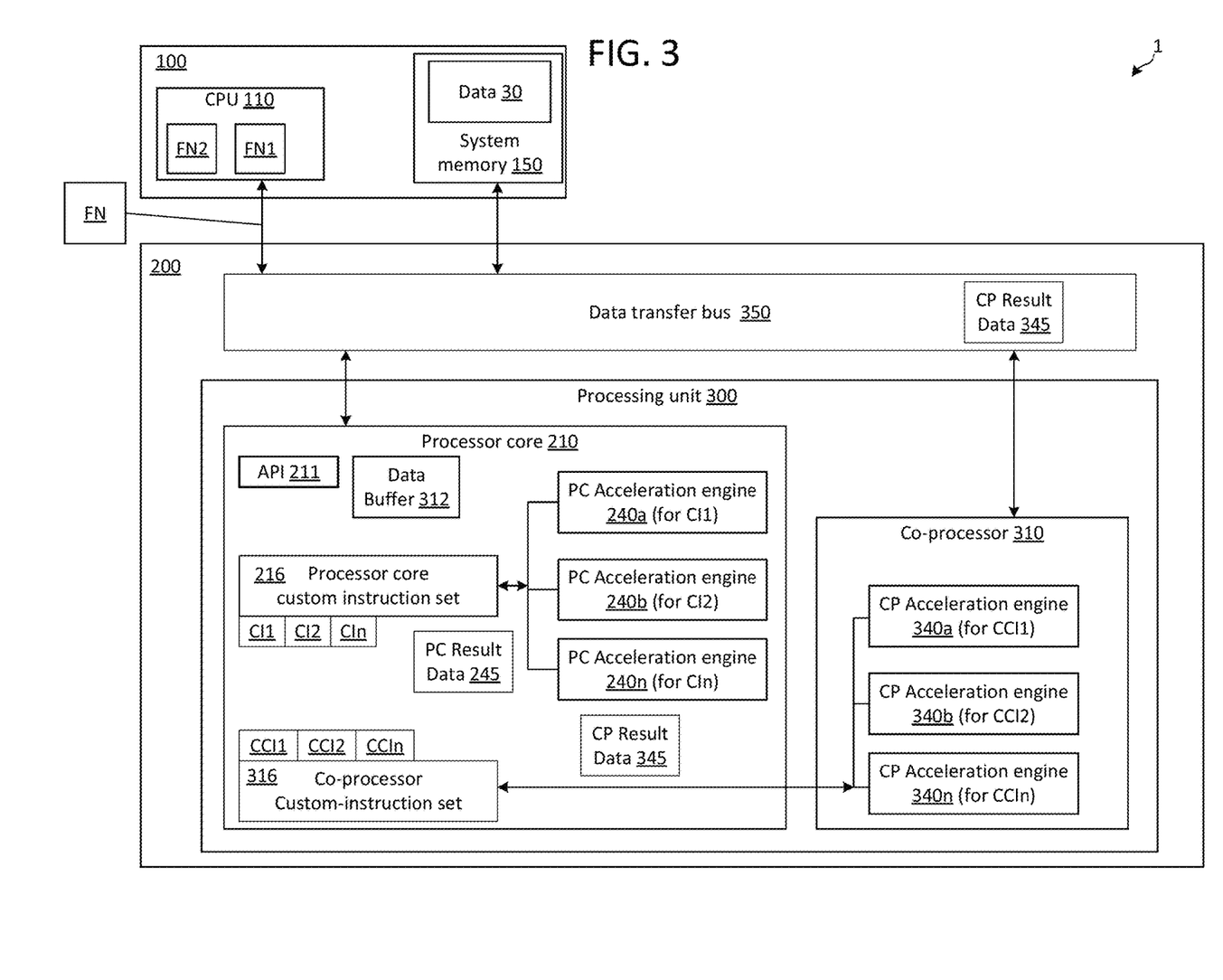
FIG. 3 is a system diagram depicting an architecture for processing a variety of functions in computational storage, according to some embodiments of the present disclosure.

FIG. 3 is a system diagram depicting an architecture for processing a variety of functions in computational storage, according to some embodiments of the present disclosure.

Referring to FIG. 3, the storage device 200, according to some embodiments of the present disclosure, may enable flexibility in processing a variety of functions near memory. In such embodiments, the storage device may include a co-processor 310. The co-processor 310 may be coupled to the processor core 210 and may include one or more co-processor acceleration engines 340 (e.g., individually depicted as 340a-n). The processor core 210 and the co-processor 310 may correspond to a processing unit 300 of the storage device 200. The co-processor acceleration engines 340 may correspond to a co-processor custom-instruction set 316. The co-processor custom-instruction set 316 may include one or more co-processor custom instructions CCI (e.g., individually depicted as CCI1-n). In some embodiments, the co-processor custom-instruction set 316 may be stored in the processor core 210 (e.g., at a general-purpose processing portion of the processor core 210).

As discussed above with respect to FIG. 1A, the processor-core acceleration engines 240 may be utilized by the storage device 200 to perform generalized (e.g., general) acceleration operations. For example, the generalized acceleration operations performed by the processor-core acceleration engines 240 may be operations that are common to a variety of functions (e.g., compare operations, addition operations, subtract operations, multiplication operations, decoding operations, graph-traversing operations, linked-list operations, parallel-comparison operations, and/or the like). The generalized acceleration operations may each have a decode stage, an execute stage, and a writeback stage.

Similar to the extra-processor-core circuit (e.g., the scan engines) discussed above with respect to FIG. 1A, the co-processor acceleration engines 340 may be hardware logic circuits that are utilized, in combination with the co-processor custom-instruction set 316, to perform more complex and/or heavy algorithms (e.g., function-specific accelerations) than the processor-core acceleration engines 240. For example, the co-processor acceleration engines 240 may be bigger acceleration engines, which are capable of performing complex algorithms, such as compression algorithms, decompression algorithms, artificial intelligence (AI) neural-network training algorithms, and AI inferencing-engine algorithms.

In some embodiments, the storage device 200 may include a data transfer bus 350 to transfer information between the host 100, the processor core 210, and the co-processor 310. For example, the data transfer bus 350 may communicate requests, commands, instructions, results, and status updates between the components of the system 1.

In some embodiments, the data transfer bus 350 may include (e.g., may be) an advanced extensible Interface (AXI) Fabric.

Accordingly, a processing (e.g., a performance) of a variety of functions according to some embodiments of the present disclosure, may include one or more of the following operations. The host 100 may send a request (e.g., a command or instructions) to the storage device 200 to perform a function FN on data 30. The function FN may be a first function FN1. For example, the first function FN1 may be a video processing function. The first function FN1 may include multiple operations (e.g., the video processing function may be performed by way of multiple smaller operations). For example, the first function FN1 may include simple acceleration operations that are common to multiple functions associated with the storage device 200 and may include function-specific operations. The processor core 210 may receive the request to perform the first function FN1 by way of the data transfer bus 350 and/or the API 211. The processor core 210 may receive the data 30 by way of a data buffer 312.

As similarly discussed above with respect to FIG. 1A, the storage device 200 may use the processor-core custom-instruction set 216 to direct the performance of operations associated with the first function FN1 to different processing circuits within the storage device 200. For example, the first processor-core custom instructions CI1 may cause one or more of the processor-core acceleration engines 240 to perform a first operation associated with the first function F1 on the data 30. The processor-core acceleration engines 240 may generate processor-core result data 245 based on the first processor-core custom instructions CI1. Similarly, the storage device 200 may use the co-processor custom-instruction set 316 to direct the performance of operations associated with the first function FN1 to different co-processor acceleration engines 340. For example, first co-processor custom instructions CCI1 may cause a first co-processor acceleration engine 340a to perform a second operation, associated with the first function F1, based on (e.g., on) the processor-core result data 245, to generate co-processor result data 345. The co-processor result data 345 may be sent to the processor core 210 or to the data transfer bus 350 for further processing.

Similarly, the host 100 may send instructions to the storage device 200 to perform a second function FN2 on the data 30. The data 30 may be the same data as or different data from the data 30 on which the first function FN1 was performed. For example, the second function FN2 may be a compression function. The second function FN2 may include multiple operations (e.g., the compression function may be performed by way of multiple smaller operations). For example, the second function FN2 may include simple acceleration operations that are common to multiple functions associated with the storage device 200 and may include function-specific operations. For example, one or more operations (e.g., one or more generalized acceleration operations) associated with the first function FN1 may also be associated with the second function FN2, and one or more operations (e.g., one or more function-specific operations) may not be associated with the first function FN1. The processor core 210 may receive the instructions to perform the second function FN2 by way of the data transfer bus 350 and/or the API 211. The processor core 210 may receive the data 30 by way of the data buffer 312.

As similarly discussed above with respect to the first function FN1, the storage device 200 may use the processor-core custom-instruction set 216 to direct the performance of operations associated with the second function FN2 to different processing circuits within the storage device 200. For example, the second processor-core custom instructions CI2 may cause one or more of the processor-core acceleration engines 240 to perform a first operation associated with the second function F2 on the data 30. The processor-core acceleration engines 240 may generate processor-core result data 245 based on the second processor-core custom instructions CI2. Similarly, the storage device 200 may use the co-processor custom-instruction set 316 to direct the performance of operations associated with the second function FN1 to different co-processor acceleration engines 340. For example, second co-processor custom instructions CCI2 may cause a second co-processor acceleration engine 340b to perform a second operation, associated with the second function F2, based on (e.g., on) the processor-core result data 245, to generate co-processor result data 345. The co-processor result data 345 may be sent to the processor core 210 or to the data transfer bus 350 for further processing.

Figure 4:
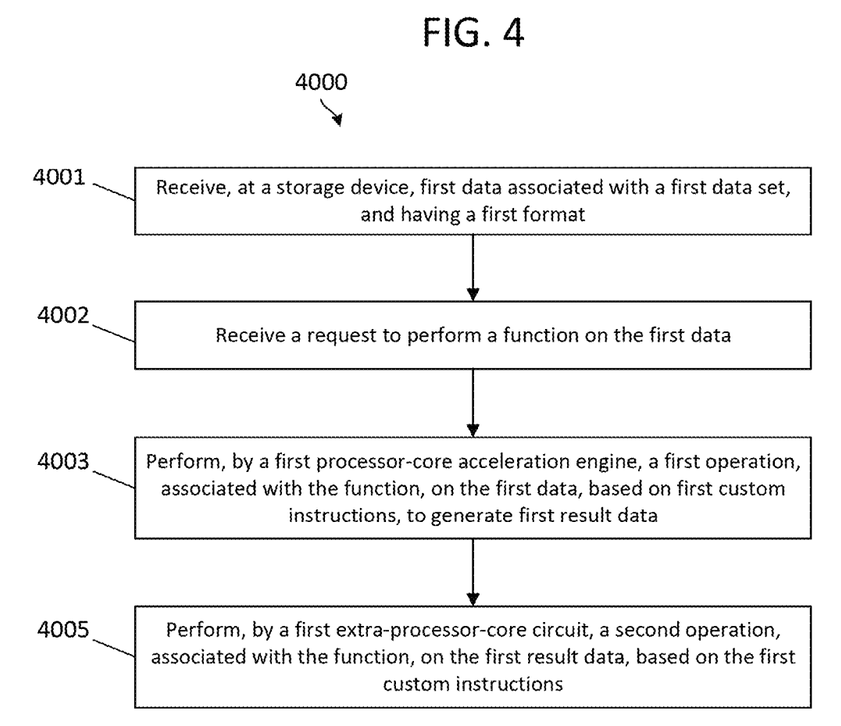
FIG. 4 is a flowchart depicting a method of processing formatted data in computational storage, according to some embodiments of the present disclosure.

FIG. 4 is a flowchart depicting a method of processing formatted data in computational storage, according to some embodiments of the present disclosure.

Referring to FIG. 4, a method 4000 of processing formatted data in computational storage may include the following example operations. A storage device 200 may receive first data (e.g., page data PD) (see FIG. 1A) associated with a first data set, and having a first format FM1 (operation 4001). A processor core 210 of the storage device 200 may receive a request (e.g., a command or instructions) from a host 100 to perform a function FN on the first data (operation 4002). A first processor-core acceleration engine 240a may perform a first operation, associated with the function FN, on the first data, based on first processor-core custom instructions CI1, to generate first result data (e.g., column data 243) (operation 4003). A first scan engine 220a of the storage device 200 may perform a second operation, associated with the function FN, on the first result data (e.g., column data 243), based on the first processor-core custom instructions CI1 (operation 4005).

Figure 5:
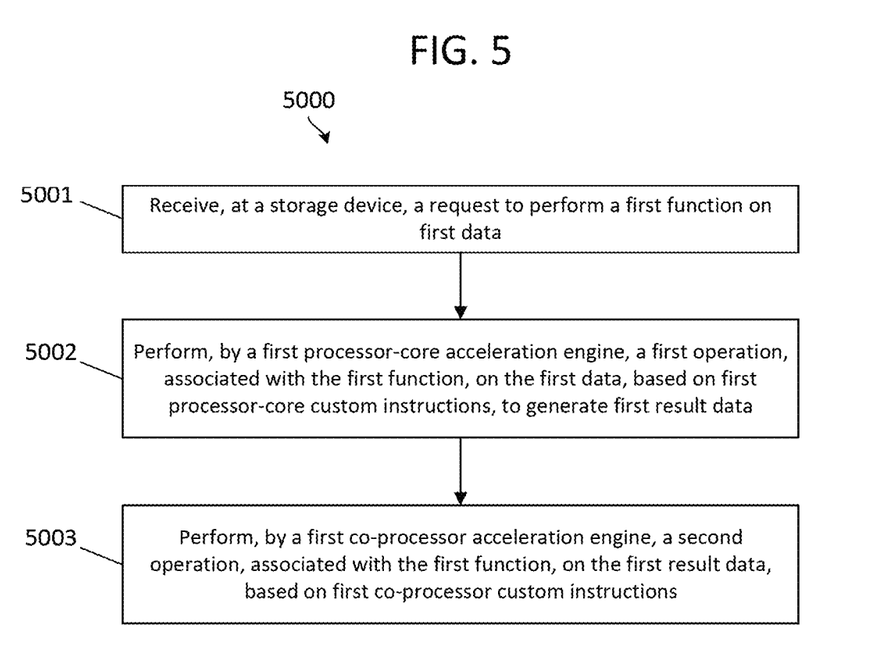
FIG. 5 is a flowchart depicting a method of processing a variety of functions in computational storage, according to some embodiments of the present disclosure.

FIG. 5 is a flowchart depicting a method of processing a variety of functions in computational storage, according to some embodiments of the present disclosure.

Referring to FIG. 5, a method 5000 of processing a variety of functions in computational storage may include the following example operations. A processor core 210 of a storage device 200 may receive a request (e.g., a command or instructions) to perform a first function FN1 on first data (operation 5001). A first processor-core acceleration engine 240a may perform a first operation, associated with the first function FN1, on the first data, based on first processor-core custom instructions CI1, to generate first result data (e.g., processor-core result data 245) (operation 5002). A first co-processor acceleration engine 340a of the storage device 200 may perform a second operation, associated with the first function FN1, on the first result data (e.g., processor-core result data 245), based on first co-processor custom instructions CCI1 (operation 5003).

Example embodiments of the disclosure may extend to the following statements, without limitation:

Statement 1. An example method includes: receiving, at a processor core of a storage device, a request to perform a first function on first data, the first function including a first operation and a second operation, performing, by a first processor-core acceleration engine of the storage device, the first operation on the first data, based on first processor-core custom instructions, to generate first result data, and performing, by a first co-processor acceleration engine of the storage device, the second operation on the first result data, based on first co-processor custom instructions.

Statement 2. An example method includes the method of statement 1, wherein the storage device is configured to receive the request to perform the first function via a communication protocol, the first processor-core custom instructions cause the first processor-core acceleration engine to perform the first operation, and the first co-processor custom instructions cause the first co-processor acceleration engine to perform the second operation.

Statement 3. An example method includes the method of any of statements 1 and 2, wherein the request is received by an application programming interface (API) coupled to the processor core.

Statement 4. An example method includes the method of any of statements 1-3 and further includes receiving a request to perform a second function on second data, wherein the second function includes a third operation and a fourth operation, and the processor core stores second processor-core custom instructions and second co-processor custom instructions, performing, by a second processor-core acceleration engine, the third operation, based on the second processor-core custom instructions, to generate second result data, and performing, by a second co-processor acceleration engine of the storage device, the fourth operation on the second result data, based on the second co-processor custom instructions.

Statement 5. An example method includes the method of any of statements 1-3, and further includes receiving a request to perform a second function on second data, wherein the second function includes the first operation and a third operation, and the processor core stores second co-processor custom instructions, performing, by the first processor-core acceleration engine, the first operation, based on the first processor-core custom instructions, to generate second result data, and performing, by a second co-processor acceleration engine of the storage device, the third operation on the second result data, based on the second co-processor custom instructions.

Statement 6. An example method includes the method of any of statements 1-5, wherein the first processor-core acceleration engine is configured to perform an acceleration operation associated with the first function, the acceleration operation including at least one of a compare operation, a decoding operation, a parsing operation, a graph-traversing operation, a linked-list operation, and a parallel-comparison operation.

Statement 7. An example method includes the method of any of statements 1-6, wherein the first co-processor acceleration engine is configured to perform a function-specific algorithm associated with the first function, the function-specific algorithm including at least one of a compression algorithm, a decompression algorithm, an artificial-intelligence (AI) neural-network training algorithm, and an AI inferencing-engine algorithm.

Statement 8. An example system for performing the method of any of statements 1-7 includes a processing unit including the processor core storing the first processor-core custom instructions and the first co-processor custom instructions, and including the first processor-core acceleration engine, and a co-processor including the first co-processor acceleration engine, and being coupled to the processor core.

Statement 9. An example storage device for performing the method of any of statements 1-7 includes a processing unit including the processor core storing the first processor-core custom instructions and the first co-processor custom instructions, and including the first processor-core acceleration engine, and a co-processor including the first co-processor acceleration engine, and being coupled to the processor core.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method for performing computations near memory, the method comprising:
   receiving, at a processor core of a storage device, a request to perform a first function on first data, the first function comprising a first operation and a second operation;
   performing, by a first processor-core acceleration engine of the storage device, the first operation on the first data, based on first processor-core custom instructions, to generate first result data; and
   performing, by a first co-processor acceleration engine of the storage device, the second operation on the first result data, based on first co-processor custom instructions.

2. The method of claim 1, wherein:
   the storage device is configured to receive the request to perform the first function via a communication protocol;
   the first processor-core custom instructions cause the first processor-core acceleration engine to perform the first operation; and
   the first co-processor custom instructions cause the first co-processor acceleration engine to perform the second operation.

3. The method of claim 1, wherein the request is received by an application programming interface (API) coupled to the processor core.

4. The method of claim 1, further comprising:
   receiving a request to perform a second function on second data, wherein:
      the second function comprises a third operation and a fourth operation; and
      the processor core stores second processor-core custom instructions and second co-processor custom instructions;
   performing, by a second processor-core acceleration engine, the third operation, based on the second processor-core custom instructions, to generate second result data; and
   performing, by a second co-processor acceleration engine of the storage device, the fourth operation on the second result data, based on the second co-processor custom instructions.

5. The method of claim 1, further comprising:
   receiving a request to perform a second function on second data, wherein:
      the second function comprises the first operation and a third operation; and
      the processor core stores second co-processor custom instructions;
   performing, by the first processor-core acceleration engine, the first operation, based on the first processor-core custom instructions, to generate second result data; and performing, by a second co-processor acceleration engine of the storage device, the third operation on the second result data, based on the second co-processor custom instructions.

6. The method of claim 1, wherein the first processor-core acceleration engine is configured to perform an acceleration operation associated with the first function, the acceleration operation comprising at least one of a compare operation, a decoding operation, a parsing operation, a graph-traversing operation, a linked-list operation, and a parallel-comparison operation.

7. The method of claim 1, wherein the first co-processor acceleration engine is configured to perform a function-specific algorithm associated with the first function, the function-specific algorithm comprising at least one of a compression algorithm, a decompression algorithm, an artificial-intelligence (AI) neural-network training algorithm, and an AI inferencing-engine algorithm.

8. A system for performing computations near memory, the system comprising:
a processing unit comprising a processor core storing first processor-core custom instructions and first co-processor custom instructions, and comprising a first processor-core acceleration engine; and
a co-processor comprising a first co-processor acceleration engine, and being coupled to the processor core, wherein the processing unit is configured to:
receive a request to perform a first function on first data, the first function comprising a first operation and a second operation;
cause the first processor-core acceleration engine to perform the first operation on the first data, based on the first processor-core custom instructions, to generate first result data; and
cause the first co-processor acceleration engine to perform the second operation on the first result data, based on the first co-processor custom instructions.

9. The system of claim 8, wherein:
the processing unit is configured to receive the request to perform the first function via a communication protocol;
the first processor-core custom instructions cause the first processor-core acceleration engine to perform the first operation; and
the first co-processor custom instructions cause the first co-processor acceleration engine to perform the second operation.

10. The system of claim 8, wherein the request is received by an application programming interface (API) coupled to the processor core.

11. The system of claim 8, wherein the processing unit is configured to:
receive a request to perform a second function on second data, wherein:
the second function comprises a third operation and a fourth operation; and
the processor core stores second processor-core custom instructions and second co-processor custom instructions;
cause a second processor-core acceleration engine to perform the third operation, based on the second processor-core custom instructions, to generate second result data; and
cause a second co-processor acceleration engine to perform the fourth operation on the second result data, based on the second co-processor custom instructions.

12. The system of claim 8, wherein the processing unit is configured to:
receive a request to perform a second function on second data, wherein:
the second function comprises the first operation and a third operation; and
the processor core stores second co-processor custom instructions;
cause the first processor-core acceleration engine to perform the first operation, based on the first processor-core custom instructions, to generate second result data; and
cause a second co-processor acceleration engine to perform the third operation on the second result data, based on the second co-processor custom instructions.

13. The system of claim 8, wherein the first processor-core acceleration engine is configured to perform an acceleration operation associated with the first function, the acceleration operation comprising at least one of a compare operation, a decoding operation, a parsing operation, a graph-traversing operation, a linked-list operation, and a parallel-comparison operation.

14. The system of claim 8, wherein the first co-processor acceleration engine is configured to perform a function-specific algorithm associated with the first function, the function-specific algorithm comprising at least one of a compression algorithm, a decompression algorithm, an artificial-intelligence (AI) neural-network training algorithm, and an AI inferencing-engine algorithm.

15. A storage device for performing computations near memory, the storage device comprising:
a processing unit comprising a processor core storing first processor-core custom instructions and first co-processor custom instructions, and comprising a first processor-core acceleration engine; and
a co-processor comprising a first co-processor acceleration engine, and being coupled to the processor core, wherein the storage device is configured to:
receive a request to perform a first function on first data, the first function comprising a first operation and a second operation;
cause the first processor-core acceleration engine to perform the first operation on the first data, based on the first processor-core custom instructions, to generate first result data; and
cause the first co-processor acceleration engine to perform the second operation on the first result data, based on the first co-processor custom instructions.

16. The storage device of claim 15, wherein:
the storage device is configured to receive the request to perform the first function via a communication protocol;
the first processor-core custom instructions cause the first processor-core acceleration engine to perform the first operation; and
the first co-processor custom instructions cause the first co-processor acceleration engine to perform the second operation.

17. The storage device of claim 15, wherein the request is received by an application programming interface (API) coupled to the processor core.

18. The storage device of claim 15, configured to:
receive a request to perform a second function on second data, wherein:
the second function comprises a third operation and a fourth operation; and the processor core comprises second processor-core custom instructions and second co-processor custom instructions;

cause a second processor-core acceleration engine to perform the third operation, based on the second processor-core custom instructions, to generate second result data; and cause a second co-processor acceleration engine to perform the fourth operation on the second result data, based on the second co-processor custom instructions.

19. The storage device of claim 15, configured to:

receive a request to perform a second function on second data, wherein:

the second function comprises the first operation and a third operation; and the processor core stores second co-processor custom instructions;

cause the first processor-core acceleration engine to perform the first operation, based on the first processor-core custom instructions, to generate second result data; and cause a second co-processor acceleration engine to perform the third operation on the second result data, based on the second co-processor custom instructions.

20. The storage device of claim 15, wherein:

the first processor-core acceleration engine is configured to perform an acceleration operation associated with the first function, the acceleration operation comprising at least one of a compare operation, a decoding operation, a parsing operation, a graph-traversing operation, a linked-list operation, and a parallel-comparison operation; and the first co-processor acceleration engine is configured to perform a function-specific algorithm associated with the first function, the function-specific algorithm comprising at least one of a compression algorithm, a decompression algorithm, an artificial-intelligence (AI) neural-network training algorithm, and an AI inferencing-engine algorithm.

* * * * *